US005116542A

United States Patent [19]

Ochi et al.

[11] Patent Number: 5,116,542

[45] Date of Patent: * May 26, 1992

[54] VARISTOR MATERIAL AND METHOD OF PRODUCING SAME FROM ZINC OXIDE AND MANGANESE OXIDE: CONTROLLED POROSITY AND HIGH NON-LINEAR COEFFICIENT

[75] Inventors: Hideo Ochi, Misato; Akihide Igari; Masaaki Toyoda, both of Saitama, all of Japan

[73] Assignee: Somar Corporation, Japan

[ * ] Notice: The portion of the term of this patent subsequent to Dec. 31, 2008 has been disclaimed.

[21] Appl. No.: 551,412

[22] Filed: Jul. 12, 1990

[30] Foreign Application Priority Data

Jul. 20, 1989 [JP] Japan .................................. 1-188624

[51] Int. Cl.[5] .......................... C04B 35/00; H01C 7/10

[52] U.S. Cl. ....................................... 252/518; 264/61; 423/596

[58] Field of Search .......................... 252/518; 423/596

[56] References Cited

U.S. PATENT DOCUMENTS 4,094,061 6/1978 Gupta et al. ........................ 29/612
5,073,302 12/1991 Igari et al. ........................ 252/518
5,076,979 12/1991 Ochi et al. ........................ 264/61

FOREIGN PATENT DOCUMENTS 0346895 6/1989 European Pat. Off. .

*Primary Examiner*—A. Lionel Clingman
*Attorney, Agent, or Firm*—Lorusso & Loud

[57] ABSTRACT

A varistor material is disclosed which has a composition consisting essentially of 93–97 mole % of ZnO and 3–7 mole % of MnO, a non-linear coefficient $\alpha$ of at least 20 and such a bulk density as to provide a porosity of greater than 15% but not greater than 50%, wherein the porosity is defined as follows:

$$\text{Porosity } (\%) = (1 - d/d_0) \times 100$$

wherein d represents the bulk density and $d_0$ represents the theoretical density of the single phase pure ZnO. The varistor material is produced by sintering a mixture containing ZnO powder and 3–7 mole %, based on ZnO+MnO, of a maganese compound at a temperature of 1100°–1350° C. under a condition so that the resulting sintered body has the above porosity.

5 Claims, No Drawings

VARISTOR MATERIAL AND METHOD OF PRODUCING SAME FROM ZINC OXIDE AND MANGANESE OXIDE: CONTROLLED POROSITY AND HIGH NON-LINEAR COEFFICIENT

This invention relates to a ZnO varistor material and a method of producing same.

It is widely known that the electric resistance of a sintered ZnO mixed with an additive varies depending on electric voltage. Such a material, generally called varistor material, has been widely applied to the stabilization of electric voltage or to the absorption of surge voltage by taking advantage of the nonlinearity between its voltage and current. The relationship between the electric current and voltage of a varistor may be expressed by the following empirical equation:

$$I=(V/C)^{\alpha}$$

wherein V represents an electric voltage applied to the varistor, I represents an electric current passing therethrough, C is a constant and $\alpha$ is a non-linear coefficient. The non-linear coefficient $\alpha$ is calculated according to the following equation:

$$\alpha=\log(I_2/I_1)/\log(V_2/V_1)$$

wherein $V_1$ and $V_2$ each represent the electric voltage at given current $I_1$ and $I_2$.

$I_1$ and $I_2$ are generally determined at 1 mA and 10 mA, respectively and $V_1$ is called a varistor voltage. The non-linear coefficient $\alpha$ varies with the composition and production method of the varistor material. Generally speaking, a varistor material with as large a non-linear coefficient $\alpha$ as possible is preferred.

A ZnO varistor material has been hitherto prepared as follows. Additives are mixed with ZnO powder and dried. The dried mixture is molded into a desired shape and subsequently sintered. During the sintering stage, the mixture is reacted to give a varistor material. A varistor element is obtained by fitting electrodes and conductors to the varistor material.

Although several theories have been reported relating to the mechanisms of the expression of varistor properties of sintered ZnO materials, no definite one has been established so far. However, it is recognized that the electric properties of a varistor originate from its microstructure. A ZnO varistor generally contains ZnO particles around which a highly resistant boundary layer is located and bound thereto. Additives are employed in order to form this boundary layer. A number of additives are generally used and the types and amounts thereof may vary depending on the aimed properties.

Conventional methods (such as disclosed in U.S. Pat. No. 4,094,061) for the production of a ZnO varistor material suffer from several problems. That is to say, the properties of sintered materials widely vary so that it is impossible to efficiently produce varistor materials of constant properties. This problem is considered to be caused by the use of a number of additives which complicatedly and delicately react with ZnO as well as with each other during sintering. These reactions are considerably affected by a change in the production conditions. Thus, it is highly difficult to uniformly control the microstructure of the sintered material and the microdistribution of chemical components thereof at a high reproducibility. Furthermore, additives which are liable to evaporate at a high temperature such as bismuth oxide have been frequently employed, so that it becomes difficult to control the microstructure of the sintered material and microdistribution of chemical components thereof.

The present invention has been made with the foregoing problems of conventional techniques in view and provides a novel varistor material having a high non-linear coefficient $\alpha$.

In accordance with one aspect of the present invention there is provided a varistor material having a composition consisting essentially of 93-97 mole % of ZnO and 3-7 mole % of MnO, a non-linear coefficient of at least 20 and such a bulk density as to provide a porosity of greater than 15% but not greater than 50%, said porosity being defined as follows:

$$Porosity(\%)=(1-d/d_0)\times 100$$

wherein d represents the bulk density and $d_0$ represents the theoretical density of the single phase pure ZnO.

In another aspect, the present invention provides a method of producing a varistor material having a non-linear coefficient of at least 20, comprising the steps of:

providing a mixture containing ZnO powder and a manganese compound, the amount of the manganese compound being 3-7 mole % in terms of MnO based on the total amount of ZnO and MnO; and sintering said mixture at a temperature of 1100°-1350° C. under a condition so that the resulting sintered body has such a bulk density as to provide a porosity of greater than 15% but not greater than 50%, said porosity being defined as follows:

$$Porosity(\%)=(1-d/d_0)\times 100$$

wherein d represents the bulk density and $d_0$ represents the theoretical density of the single phase pure ZnO.

It has been found that when ZnO powder is mixed with a specific amount, i.e. 3-7 mole %, of only one specific additive, i.e. a Mn compound and sintered so as to have a specific porosity, i.e. 15-50%, a varistor material with a high non-linearity, i.e. a non-linear coefficient of at least 20 may be obtained.

The present invention will now be described in detail below.

The varistor material according to the present invention has a composition of 93-97 mole % of ZnO and 3-7 mole % of MnO, preferably 94-96 mole % of ZnO and 4-6 mole % of MnO. An amount of MnO outside of the above-specified range is disadvantageous because it is very difficult to obtain a varistor material having a non-linear coefficient $\alpha$ of 20 or more.

It is important that the varistor material should have a porosity of more than 15% in order for the material to show a non-linear coefficient $\alpha$ of at least 20. Too high a porosity in excess of 50%, on the other hand, is disadvantageous because the mechanical strength of the resulting varistor material is lowered and the electrical resistance thereof becomes excessively high. Preferably, the porosity is in the range of 20-40%. It is desired that the pores of the varistor material be uniform in size and have a pore size of 50 μm or less, more preferably 10 μm or less.

The formation of pores may be effected by any known methods such as (a) a method in which the particle size of a raw material powder is controlled so as to lower the bulk density thereof, (b) a method in which molding is performed under a controlled pressure, (c) a method in which a blowing agent is added to a raw material to be sintered, and (d) a method in which a solvent-soluble substance is added to a raw material, the substance being subsequently removed by extraction with an appropriate solvent from a molded body obtained from the raw material. The former two methods are advantageous because there is no fear of contamination of impurities, while the latter two methods have a merit that it is easy to control the porosity in a wide range.

A method for the production of the varistor material according to the present invention adopting the method (c) above will now be described. A homogeneous mixture of ZnO powder and a manganese compound is first prepared. For this purpose, it is preferable to dissolve the manganese compound in a suitable solvent and to mix the resulting solution with ZnO powder. Alternatively, the manganese compound is mixed with ZnO powder in the presence of a suitable solvent capable of dissolving the manganese compound. By this, the manganese compound is homogeneously mixed with and supported by the ZnO powder.

As such a solvent, water or an organic solvent which does not interact with ZnO and which is easily removed by evaporation is used. As the manganese compound, there may be used manganese oxide or a compound capable of being converted into manganese oxide upon calcination, such as manganese hydroxide or an inorganic or organic salt of manganese. Illustrative of suitable inorganic salts are nitrate and halogenides. Illustrative of suitable organic salts are acetate, propionate and benzoate.

The thus obtained wet mixture is then dried by removal of the solvent, followed by pulverization and calcined. The calcination is generally performed at a temperature of 600–900° C.

The calcined mass is then ground and mixed with a blowing agent using, for example, a ball mill. As the blowing agent, an organic substance which consists of carbon, hydrogen, oxygen and/or nitrogen, which has a boiling point of at least 200° C. and which decomposes or evaporates at 600° C. or below is used. The use of a blowing agent containing an element other than C, H, O and N should be avoided since such an element may adversely affect the properties of the resulting varistor material. A blowing agent having a boiling point of below 200° C. causes difficulties in forming uniform pores. When the decomposition or boiling point of the blowing agent exceeds 600° C., there is a danger that the blowing agent fails to be perfectly removed during sintering and forms residues in the sintered mass. Examples of suitable blowing agents include waxes, carbohydrates such as sugar and starch, hydrocarbons such as liquid paraffin, polypropylene and polystyrene, liquid or solid, oxygen-containing polymers such as polyethylene glycol, polyvinylbutyral, polyvinyl alcohol and polymethacrylate. The blowing agent is used in an amount effective to obtain a porous varistor material having a desired porosity.

The blowing agent-containing, calcined mixture thus obtained is subsequently molded into a desired shape and the shaped body is then heated in air or in an oxygen-containing atmosphere for the removal of the blowing agent by decomposition or evaporation. The heating is suitably performed from room temperature up to 600° C. with a heating rate of generally not greater than 6° C./minute.

The resulting body is then sintered at 1,100°–1,350° C. in air or in an oxygen-containing atmosphere. A sintering temperature of below 1,000° C. is insufficient to effect sintering and results in a considerable increase in electric resistance of the sintered body. When, on the other hand, the sintering is performed at a temperature of 1,350° C. or more, deformation of the sintered body is apt to occur.

The following examples will further illustrate the present invention.

EXAMPLE 1

ZnO powder was mixed, in ethanol, with manganese nitrate ($Mn(NO_3)_2.6H_2O$) in an amount of 5 mole % as MnO based on the total amount of ZnO and MnO. The mixture was dried and calcined at 700° C. for 1 hour. The calcined mixture was then commingled with a quantity of granulated sugar in methyl ethyl ketone using a planetary ball mill formed of agate. The resulting mass was dried, sieved through a 150 mesh sieve, shaped under a pressure of 300 kg/cm$^2$ into a disc with a diameter of 10 mm and a thickness of 2 mm, and press molded under a hydrostatic pressure of 1 ton/cm$^2$. The molded body was placed in a resistance heating-type electric oven and heated in air at heating rates of 6° C./minute between room temperature and 150° C., 0.8° C./minute between 150° and 250° C., and 6° C./minute between 250° and 1300° C. and maintained at 1300° C. for 1 hour. The resulting sintered body was measured for its non-linear coefficient, specific resistance, varistor voltage and bulk density. The bulk density is measured according to the Archimedes's method using mercury, from which the porosity of the sintered body was calculated according to the following equation:

$$Porosity(\%)=(1-d/d_0)\times 100$$

wherein d represents the bulk density and $d_0$ represents the theoretical density of the single phase pure ZnO.

The above procedure was repeated using various amounts of the blowing agent (sugar) and the properties of the sintered products were measured. The results are summarized in Table 1 below.

TABLE 1

| | | | | | |
|---|---|---|---|---|---|
| Amount of sugar (% by weight) | 0 | 10 | 15 | 20 | 25 |
| Amount of MnO (mole %) | 5 | 5 | 5 | 5 | 5 |
| Porosity (%) | 5.2 | 17.0 | 24.3 | 30.0 | 36.5 |
| Non-linear coefficient α | 7.5 | 21.0 | 27.7 | 28.9 | 29.9 |
| Specific resistance (× 10$^7$ Ω· cm) | 1.2 | 17 | 23 | 32 | 40 |
| Varistor voltage (V) | 364 | 420 | 439 | 620 | 796 |

EXAMPLE 2

Example 1 was repeated in the same manner as described except that the amount of manganese nitrate was varied as shown in Table 2, with the amount of the sugar being maintained at 15% by weight based on the weight of the calcined mixture. The porosity and non-linear coefficient of the resulting sintered bodies are shown in Table 2.

TABLE 2

| | | | | | |
|---|---|---|---|---|---|
| Amount of MnO (mole %) | 3 | 4 | 5 | 6 | 7 |

TABLE 2-continued

| | | | | | |
|---|---|---|---|---|---|
| Porosity (%) | 23.0 | 21.2 | 24.3 | 25.8 | 28.9 |
| Non-linear coefficient α | 21.2 | 22.0 | 27.7 | 23.3 | 20.1 |

EXAMPLE 3

ZnO powder with a first particle size was mixed, in ethanol, with manganese nitrate ($Mn(NO_3)_2 6H_2O$) in an amount of 5 mole % as MnO based on the total amount of ZnO and MnO. The mixture was dried and calcined at 700° C. for 1 hour to obtain a first calcined mixture having a particle size of 2–5 μm. Another ZnO powder with a second particle size was mixed, in ethanol, with manganese nitrate ($Mn(NO_3)_2 6H_2O$) in an amount of 5 mole % as MnO based on the total amount of ZnO and MnO. The mixture was dried and calcined at 700° C. for 1 hour to obtain a second calcined mixture having an average particle size of 0.5 μm. 80 Parts by weight of the first calcined mixture were mixed with 20 parts by weight of the second calcined mixture and the resulting blend was shaped under a pressure of 300 kg/cm$^2$ into a disc with a diameter of 10 mm and a thickness of 2 mm. The disc was then press molded under a hydrostatic pressure of 1 ton/cm$^2$. The molded body was placed in a resistance heating-type electric oven and heated to 1300° C. in air at a heating rate of 6° C./minute and maintained at 1300° C. for 1 hour. The resulting sintered body was found to have a non-linear coefficient α of 38.8, a specific resistance of $1.6\times10^9 \Omega$·cm, a varistor voltage of 551 V and a porosity of 24.2%. For the purpose of comparison, the second calcined mixture by itself was molded and sintered. The resulting sintered body was found to have a non-linear coefficient α of 7.5, a specific resistance of $1.2\times10^7 \Omega$·cm, a varistor voltage of 364 V and a porosity of 5.2%.

We claim:

1. A varistor material having a composition consisting essentially of 93–97 mole % of ZnO and 3–7 mole % of MnO, a non-linear coefficient of at least 20 and such a bulk density as to provide a porosity of greater than 15% but not greater than 50%, said porosity being defined as follows:

$$Porosity(\%) = (1 - d/d_0) \times 100$$

wherein d represents the bulk density and $d_0$ represents the theoretical density of the single phase pure ZnO.

2. A varistor material as claimed in claim 1, wherein the porosity is 20–40%.

3. A varistor material as claimed in claim 1, wherein the content of MnO is 4–6 mole %.

4. A varistor material as claimed in claim 1 and obtained by sintering a mixture of ZnO powder and a manganese compound at a temperature of 1100°–1350° C.

5. A method of producing a varistor material having a non-linear coefficient of at least 20, comprising the steps of:

providing a mixture containing 93–97 mole % ZnO powder and 3–7 mole % of a manganese compound in terms of MnO; and sintering said mixture at a temperature of 1100°–1350° C. to produce a sintered body having a bulk density providing a porosity of greater than 15% but not greater than 50%, said porosity being defined as follows:

$$Porosity(\%) = (1 - d/d_0) \times 100$$

wherein d represents the bulk density and $d_0$ represents the theoretical density of the single phase pure ZnO.

* * * * *